(12) United States Patent
Kah, III (10) Patent No.: US 11,541,411 B2
(45) Date of Patent: Jan. 3, 2023

(54) SPRINKLER ELBOW CONNECTOR WITH INTEGRAL PRESSURE REGULATOR

(71) Applicant: Carl L. C. Kah, III, North Palm Beach, FL (US)

(72) Inventor: Carl L. C. Kah, III, North Palm Beach, FL (US)

( * ) Notice: Subject to any disclaimer, the term of this patent is extended or adjusted under 35 U.S.C. 154(b) by 326 days.

(21) Appl. No.: 16/538,202

(22) Filed: Aug. 12, 2019

(65) Prior Publication Data
US 2021/0046498 A1   Feb. 18, 2021

(51) Int. Cl.
| | | |
|---|---|---|
| F16K 17/30 | (2006.01) |
| B05B 12/08 | (2006.01) |
| B05B 1/32 | (2006.01) |
| B05B 15/65 | (2018.01) |
| G05D 16/10 | (2006.01) |
| F16K 1/42 | (2006.01) |

(52) U.S. Cl.
CPC ............ B05B 12/087 (2013.01); B05B 1/323 (2013.01); B05B 15/65 (2018.02); F16K 1/42 (2013.01); F16K 17/30 (2013.01); G05D 16/10 (2013.01); F16K 1/427 (2013.01)

(58) Field of Classification Search
CPC ....... B05B 12/087; B05B 1/323; B05B 15/74; F16K 17/30; F16K 1/42; F16K 1/427; G05D 16/103
See application file for complete search history.

(56) References Cited

U.S. PATENT DOCUMENTS

| | | | | |
|---|---|---|---|---|
| 383,877 | A * | 6/1888 | Gale et al. | F16K 17/30 |
| | | | | 137/517 |
| 769,278 | A * | 9/1904 | Secord | B05B 15/62 |
| | | | | 239/273 |
| 4,171,775 | A * | 10/1979 | Unruh | B05B 3/0422 |
| | | | | 239/206 |
| 4,479,611 | A * | 10/1984 | Galvis | B05B 15/74 |
| | | | | 239/205 |
| 4,913,352 | A * | 4/1990 | Witty | B05B 15/74 |
| | | | | 239/104 |
| 5,265,803 | A * | 11/1993 | Thayer | B05B 1/30 |
| | | | | 239/71 |
| 5,779,148 | A * | 7/1998 | Saarem | B05B 1/323 |
| | | | | 239/104 |
| 6,997,393 | B1 * | 2/2006 | Angold | B05B 15/74 |
| | | | | 239/205 |
| 7,438,083 | B2 * | 10/2008 | Feith | G05D 16/106 |
| | | | | 137/315.04 |
| 2012/0118405 | A1 * | 5/2012 | Kah, Jr. | B05B 12/087 |
| | | | | 137/505 |

* cited by examiner

Primary Examiner — Umashankar Venkatesan
(74) Attorney, Agent, or Firm — Amster, Rothstein & Ebenstein LLP

(57) ABSTRACT

A pressure regulator for use in an elbow connector for use with a sprinkler assembly including a pressure responsive member, movably mounted in the elbow connector and movable from an open position allowing flow of water into the sprinkler assembly and a closed position where the bottom edge of the pressure responsive member blocks the flow of water into the sprinkler assembly. The pressure responsive member is biased in the open position and moves into the closed position when downstream water pressure exceeds a predetermined value.

18 Claims, 10 Drawing Sheets

SPRINKLER ELBOW CONNECTOR WITH INTEGRAL PRESSURE REGULATOR

BACKGROUND

Field of the Disclosure

The present invention relates to a pressure regulator integrated into an elbow connector of a sprinkler in an irrigation system. In particular, the pressure regulator is mounted in a vertical portion of an elbow connector that is connected to an inlet of a sprinkler to control the flow of water into the sprinkler without taking up room inside the sprinkler.

Related Art

Pressure regulation is an important consideration in irrigation systems. Variations in pressure in an irrigation system are common and may be localized to particular sprinkler assemblies. These pressure variations may result in excessive water waste.

Conventional sprinklers typically include a pressure regulator in the flow path inside the sprinkler assembly. Such regulators take up space in the sprinkler and may interfere with or complicate the operation of the sprinkler itself. Including a pressure regulator in the body of the sprinkler also increases the cost of the sprinkler.

Accordingly, it would be beneficial to provide a pressure regulator suitable for use with individual sprinkler assemblies to regulate pressure and prevent water waste.

SUMMARY

It is an object of the present disclosure to provide a pressure regulator for use in an elbow connector used to supply water to an individual sprinkler assembly to regulate pressure and prevent waste.

A pressure regulator assembly mounted in an elbow connector in accordance with an embodiment of the present disclosure includes: a stationary valve seat mounted in the elbow connector; and a pressure responsive member mounted above the stationary valve seat and movable between an open position in which water flows through the stationary valve seat and a closed position in which the pressure responsive member blocks flow of water through the stationary valve seat; wherein the pressure responsive member is biased into the open position and movement of the pressure responsive member depends on prevailing pressure upstream of the pressure responsive member.

In embodiments, the elbow connector includes a horizontal segment configured for connection to a water supply; and a vertical segment, in fluid communication with the horizontal segment and extending upward therefrom, wherein the pressure regulator is mounted in the vertical segment.

In embodiments, the stationary valve seat is mounted at an inlet of the vertical segment.

In embodiments, the stationary valve seat includes a grate, and the grate includes: a ring-shaped base positioned at the inlet of the vertical segment; one or more ribs extending downward from the ring-shaped base and connected to a disk element such that one or more slots are formed between the ribs and the disk element to allow water to flow into the stationary valve seat, wherein the one or more slots are positioned such that the pressure responsive member blocks the one or more slots when it is in the closed position.

In embodiments, the regulator assembly includes a retainer element mounted above the stationary valve seat; an inner seal positioned between the retainer element and the pressure responsive member to prevent water from leaking between the retainer element and the pressure responsive member; and an outer seal positioned between the stationary valve seat and an inner wall of the vertical segment to prevent water from leaking between the stationary valve seat and the vertical segment such that water passes through the one or more slots in order to flow upward through the vertical segment.

In embodiments, the pressure regulator assembly includes a biasing element positioned between the pressure responsive member and the retainer element and biasing the pressure responsive member in the open position.

In embodiments, the vertical segment includes a pressure reference opening formed therein at a point substantially in the middle of the pressure responsive member to provide a reference pressure.

In embodiments, the pressure regulator assembly includes an upper retainer element provided in a top portion of the vertical segment and positioned to hold the pressure responsive element in the vertical segment.

In embodiments, the pressure regulator assembly includes an upper seal positioned between the upper retainer element and the pressure responsive member and configured to prevent water from leaking between the pressure responsive member and the upper retainer.

In embodiments, the pressure regulator assembly includes a cap spacer mounted below the stationary valve seat and in contact with the stationary valve seat to hold it in place at the inlet of the vertical segment An elbow connector configured for connection to a sprinkler assembly in accordance with an embodiment of the present disclosure includes a horizontal segment in fluid communication with a source of water; a vertical segment in fluid communication with the horizontal segment and extending upward therefrom; and a pressure regulator assembly, wherein the pressure regulator assembly includes a stationary valve seat; and a pressure responsive member mounted above the stationary valve seat and movable between an open position in which water flows through the stationary valve seat and a closed position in which the pressure responsive member blocks flow of water through the stationary valve seat; wherein the pressure responsive member is biased in the open position and movement of the pressure responsive member depends on prevailing pressure upstream of the elbow connector.

In embodiments, the pressure regulator assembly is mounted in the vertical segment such that the stationary valve seat is mounted at an inlet of the vertical segment.

In embodiments, the stationary valve seat further comprises a grate through which water flows into the vertical segment, wherein the grate includes: a ring-shaped base positioned at the inlet of the vertical segment; one or more ribs extending downward from the ring-shaped base and connected to a disk element such that one or more slots are formed between the ribs and the disk element to allow water to flow into the stationary valve seat, the one or more slots are positioned such the pressure responsive member blocks the one or more slots when in the closed position.

In embodiments, the elbow connector includes a retainer element mounted above the stationary valve seat to prevent upward movement of the stationary valve seat; an inner seal positioned between the retainer element and the pressure responsive member to prevent water from leaking between the retainer element and the pressure responsive member;

and an outer seal positioned between the stationary valve seat and an inner wall of the vertical segment to prevent water from leaking between the stationary valve seat and the vertical segment such that water passes through the one or more slots in order to flow upward through the vertical segment.

In embodiments, the elbow connector includes a biasing element positioned between the pressure responsive member and the retainer element and biasing the pressure responsive member in the open position.

In embodiments, the vertical segment includes a pressure reference opening formed therein at a point substantially in the middle of the pressure responsive member to provide a reference pressure.

In embodiments, the elbow connector includes an upper retainer element provided in a top portion of the vertical segment and positioned to hold the pressure responsive element in the vertical segment.

In embodiments, the elbow connector includes an upper seal positioned between the upper retainer element and the pressure responsive member and configured to prevent water from leaking between the pressure responsive member and the upper retainer.

In embodiments, the elbow connector includes a cap spacer mounted below the stationary valve seat and in contact with the stationary valve seat to hold it in place at the inlet of the vertical segment.

In embodiments, the elbow connector includes a fastener provided on an outer surface of the vertical segment and operable to connect to the sprinkler assembly.

BRIEF DESCRIPTION OF THE DRAWINGS

The above and related objects, features and advantages of the present disclosure will be more fully understood by reference to the following detailed description of the preferred, albeit illustrative, embodiments of the present invention when taken in conjunction with the accompanying figures, wherein.

DETAILED DESCRIPTION OF THE EXEMPLARY EMBODIMENTS

Figure 1:
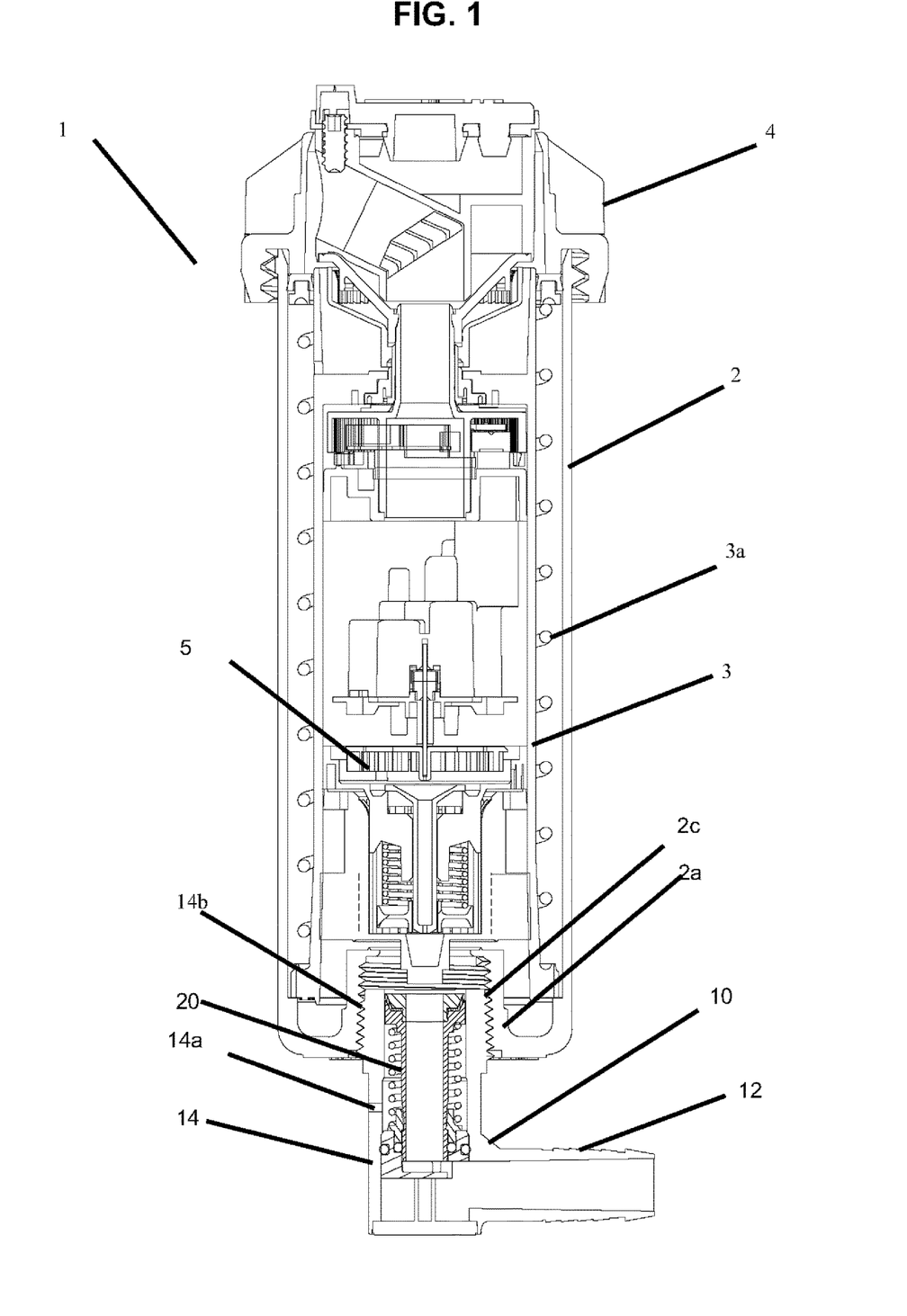
FIG. 1 illustrates an exemplary cross-sectional view of a sprinkler assembly connected to an elbow connector including a pressure regulator assembly in accordance with an embodiment of the present application.

FIG. 1 illustrates a cross-sectional view of an exemplary sprinkler assembly 1 that is connected to an elbow connector 10 at an inlet 2a of the sprinkler assembly 1. In embodiments, the sprinkler assembly 1 may include a base or body 2 in which a riser 3 is movably mounted such that the riser is movable upward when acted on by water entering the base 2 via the inlet 2a. In embodiments, water flows into the base 2 and pushes the riser 3 upward. When water is not flowing through the inlet 2a, the riser spring 3a biases the riser 3 into a retracted position as can be seen in FIG. 1. In embodiments, a turbine 5 may be provided in the base 2 and is operatively connected to a nozzle housing 4 mounted on a top of the riser 3. In embodiments, as water passes through the turbine 5, the turbine will rotate the nozzle housing 4. In embodiments, the arc of rotation of the nozzle housing 4 may be set by a user.

Figure 2:
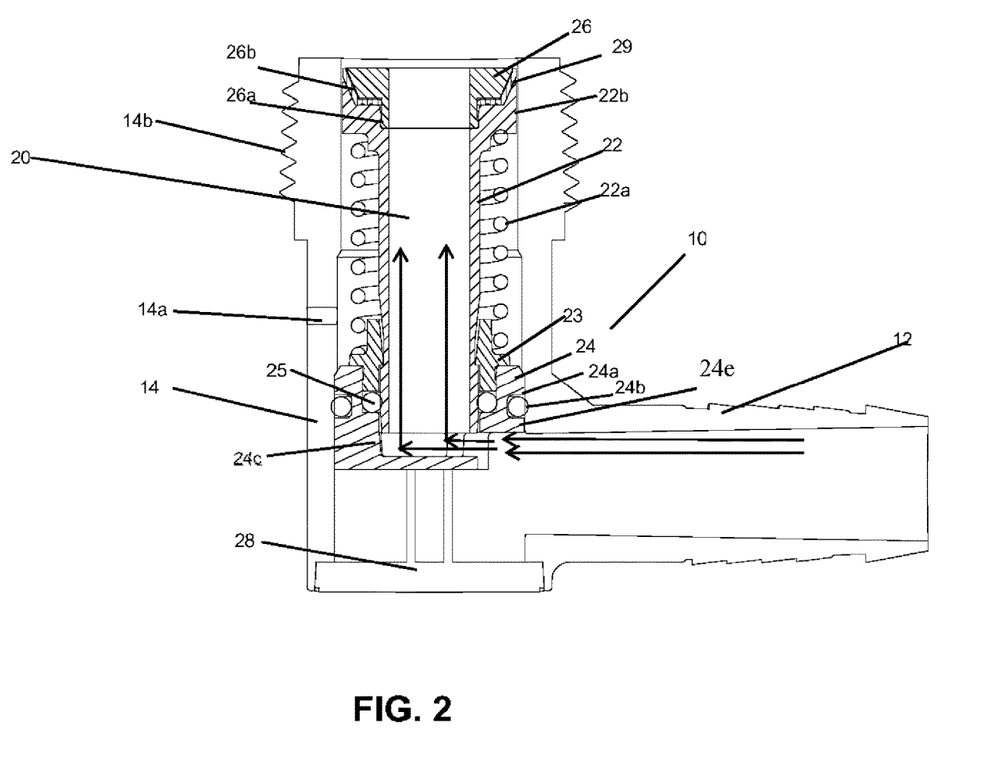
FIG. 2 illustrates the elbow connector with the pressure regulator assembly of FIG. 1 in a fully open position in accordance with an embodiment of the present application.
Figure 3:
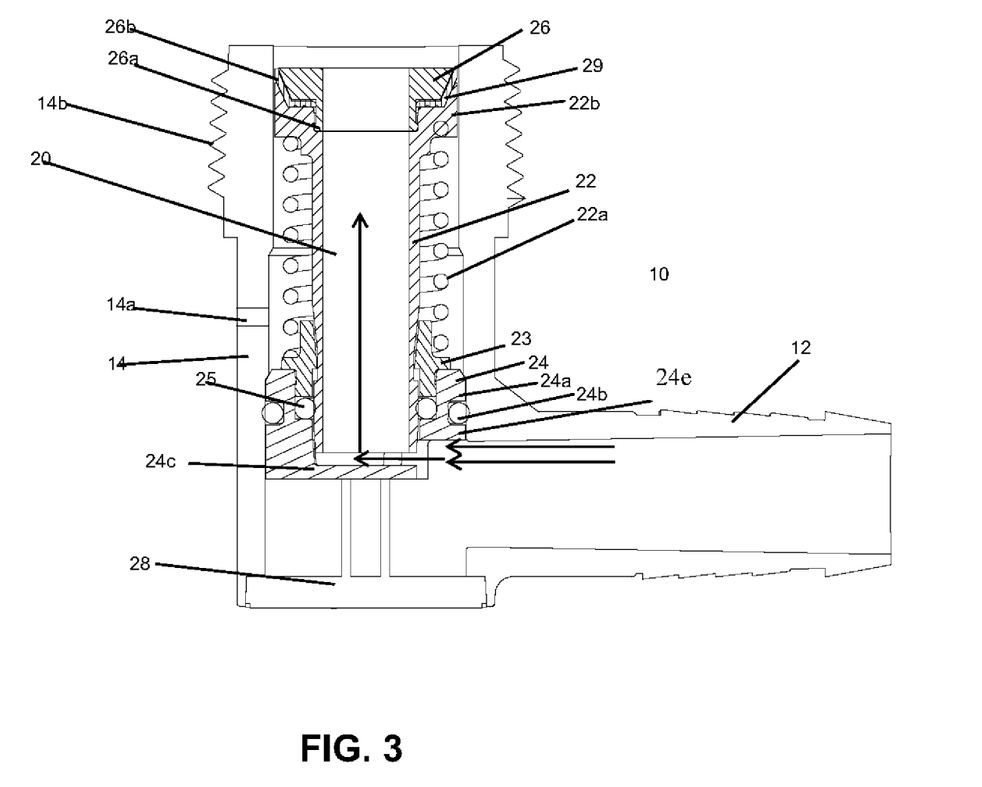
FIG. 3 illustrates the elbow connector with the pressure regulator assembly of FIG. 1 in a partially closed position in accordance with an embodiment of the present application.

FIG. 2 shows a more detailed view of the elbow connector 10. In embodiments, the elbow connector 10 includes a horizontal segment 12 that is in fluid communication with a supply of water. In embodiments, the horizontal segment 12 may be connected to a supply pipe in an irrigation system. In embodiments, a supply of water flows through the supply pipe and may be controlled by one or more switches that may be controlled by one or more electronic controllers. In embodiments, the switches may be solenoids that are operated by the electronic controller. In embodiments, the switches may be manually operated. In embodiments, a supply of water provided through the supply pipe may be controlled by the opening and closing of a spigot. In embodiments, any suitable means may be used to control the flow of water to the elbow connector 10. In embodiments, as illustrated in FIGS. 1-4, for example, the horizontal element 12 is substantially cylindrical in shape and generally hollow to allow for the flow of fluid, such as water, therethrough.

In embodiments, the horizontal segment 12 may be in fluid communication with a vertical segment 14 that extends upward from the horizontal segment 12. In embodiments, a top portion of the vertical element 14 is in fluid communication with the inlet 2a formed in the bottom of the body 2 of the sprinkler 1. In embodiments, the outer surface of at least the top portion of the vertical segment 14 may include threads 14b. In embodiments, these threads 14b may interact with a set of body threads 2c formed on an inner surface of the inlet 2a to secure the vertical element 14 to the body 2. In embodiments, any other suitable fastener may be used to connect the vertical segment 14 to the inlet 2a of the body 2.

In embodiments, a pressure regulator assembly 20 may be mounted in the vertical segment 14 of the elbow connector 10. In embodiments, the pressure regulator assembly 20 may include a movable pressure responsive member 22 that is movably mounted in the vertical segment 14. In embodiments, the pressure responsive member 22 may be biased into a raised, open position by the pressure biasing element 22a as illustrated in FIG. 2. In embodiments, the pressure biasing element 22a may be positioned between a top ring 22b formed around a top portion of the pressure responsive element 22 and a retainer element 23.

In embodiments, a stationary valve seat 24 may be provided below the retainer element 23. In embodiments, the stationary valve seat 24 may be positioned at an inlet of the vertical segment 14. In embodiments, the stationary valve seat 24 may include a seal groove 24a formed around an outer surface thereof. In embodiments, the seal groove 24a may be configured to receive a seal 24b such that liquid does not leak around the stationary valve seat 24. In embodiments, the seal 24b may be an O-ring. In embodiments the seal 24b may prevent water from flowing around the stationary valve seat 24. In embodiments, the seal 24b may be any suitable seal structure. In embodiments, a second seal 25 may be provided adjacent to an interior surface of the lower retainer element 23 and held in place by the retainer element. In embodiments, the seal 25 prevents water from flowing between the inner surface of the stationary valve seat 24 and the outer surface of the pressure responsive member 22. Accordingly, water is directed through the inlet grate 24c of the valve seat 24 into the vertical segment 14.

Figure 6:
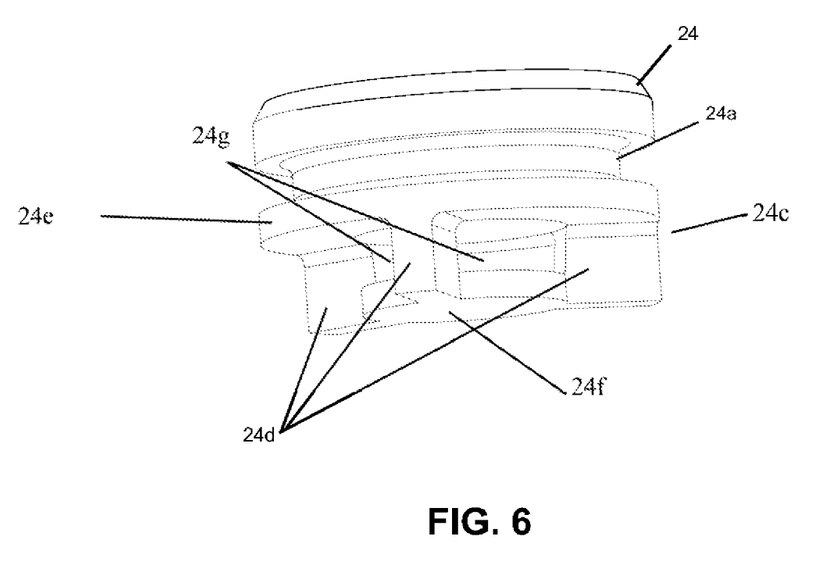
FIG. 6 illustrates a more detailed view of a valve seat in the pressure regulator assembly in FIG. 1 in accordance with an embodiment of the present application.
Figure 7:
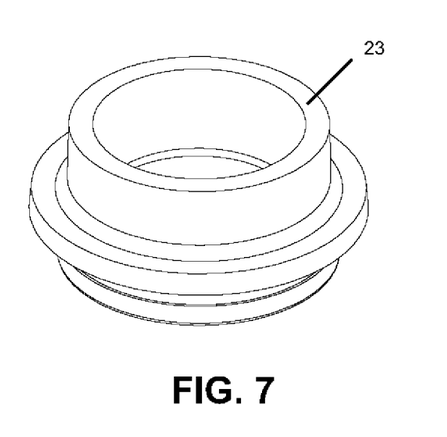
FIG. 7 illustrates a more detailed view of a lower retainer element in the pressure regulator assembly of FIG. 1 in accordance with an embodiment of the present application.

In embodiments, the inlet grate 24c may include multiple ribs 24d that extend downward from the ring-shaped base 24e and are spaced from each other as can be seen in FIG. 6, for example. In embodiments, the ribs 24d connect to the disk 24f such that slots 24g are formed between the ribs. Water flows through these slots and into the pressure responsive member and the vertical segment 14.

Figure 8:
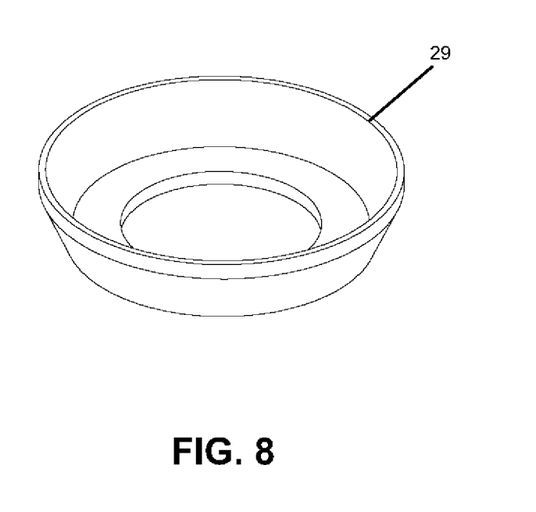
FIG. 8 illustrates a more detailed view of a seal used in the pressure regulator assembly of FIG. 1 in accordance with an embodiment of the present application.
Figure 9:
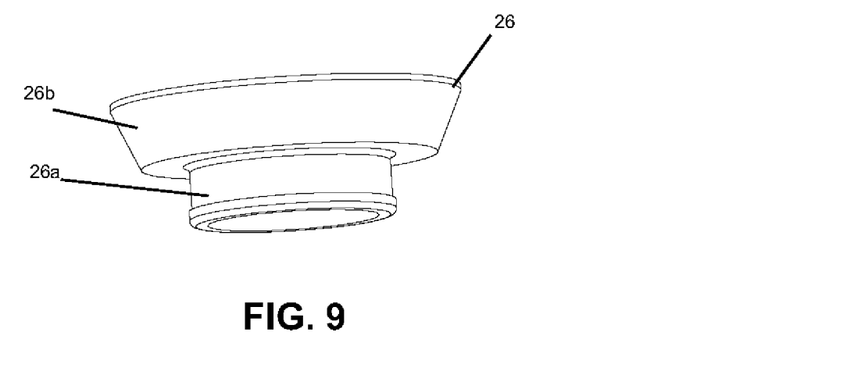
FIG. 9 illustrates a more detailed view of an upper retainer element used in the pressure regulator assembly of FIG. 1 in accordance with an embodiment of the present application.

In embodiments, an upper retainer 26 may be provided at a top of the vertical segment 14. In embodiments, a lower portion 26a of the upper retainer may extend down into the pressure responsive member 22 and hold it in the vertical segment 14. FIG. 9 illustrates a more detailed view of the upper retainer 26. In embodiments, a seal 29 may be provided between the pressure responsive member 22 and a top portion 26b of the upper retainer 26 to prevent leakage of water between the upper retainer and the pressure responsive member. FIG. 8 illustrates a more detailed view of the seal 29.

Figure 10:
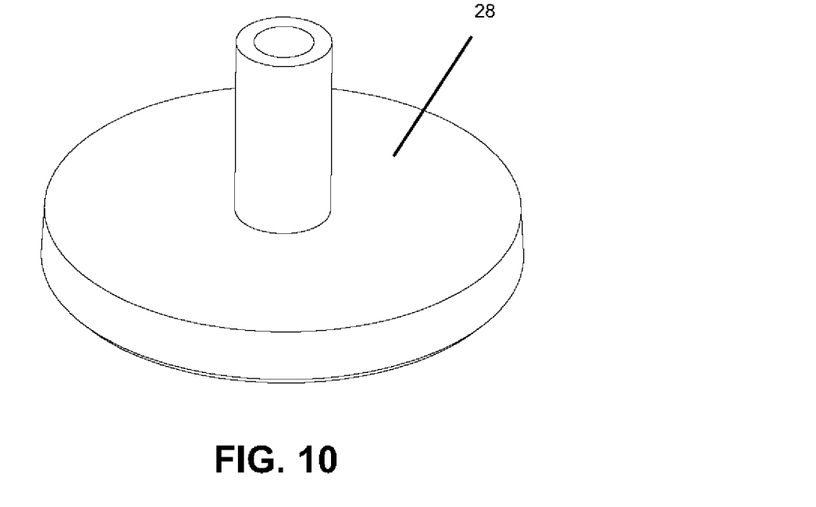
FIG. 10 illustrates a more detailed view of a spacer cover used in the pressure regulator assembly of FIG. 1 in accordance with an embodiment of the present application.

In embodiments, a spacer cap 28 may be provided below the valve seat 24. In embodiments, a top portion of the spacer cap 28 is in contact with the disk 24f of the valve seat 24 and holds the valve seat 24 in place in the inlet of the vertical segment 14. A bottom portion of the spacer cap 28 contacts an inner surface of the bottom of the horizontal segment 12 of the elbow connector 10. FIG. 10 includes a more detailed illustration of the spacer cap 28.

In operation, in embodiments, when the pressure responsive member 22 is in the open position of FIG. 2, water flows through the horizontal segment 12, through the inlet grate 24c and up through the pressure responsive member 22 into the vertical segment 14. From there the water flows up into the inlet 2a of the sprinkler assembly 1. The arrows in FIG. 2 illustrate an exemplary flow path through the pressure regulator assembly 20.

In embodiments, when pressure upstream of the pressure responsive member rises, it pushes the pressure responsive member 22 downward against the bias force of the pressure biasing element 22a to restrict the flow of water through the inlet grate 24c. The arrows in FIG. 3 indicate this reduced flow of water into the vertical segment 14. The reduced flow of water through the vertical segment 14 and into the inlet 2a of the sprinkler body 2 results in reduced pressure in the nozzle assembly 4, as well, which avoids waste. The reference pressure opening 14a provides a reference pressure. The exterior of the vertical segment 14 of the elbow connector 10 is generally positioned within several inches of the top surface of the soil when the elbow connector and sprinkler assembly 1 are installed. Accordingly, the reference pressure is sufficiently close to the atmospheric pressure at the outlet of the nozzle housing so that the pressure regulator assembly 20 is effective at preventing water waste.

Figure 4:
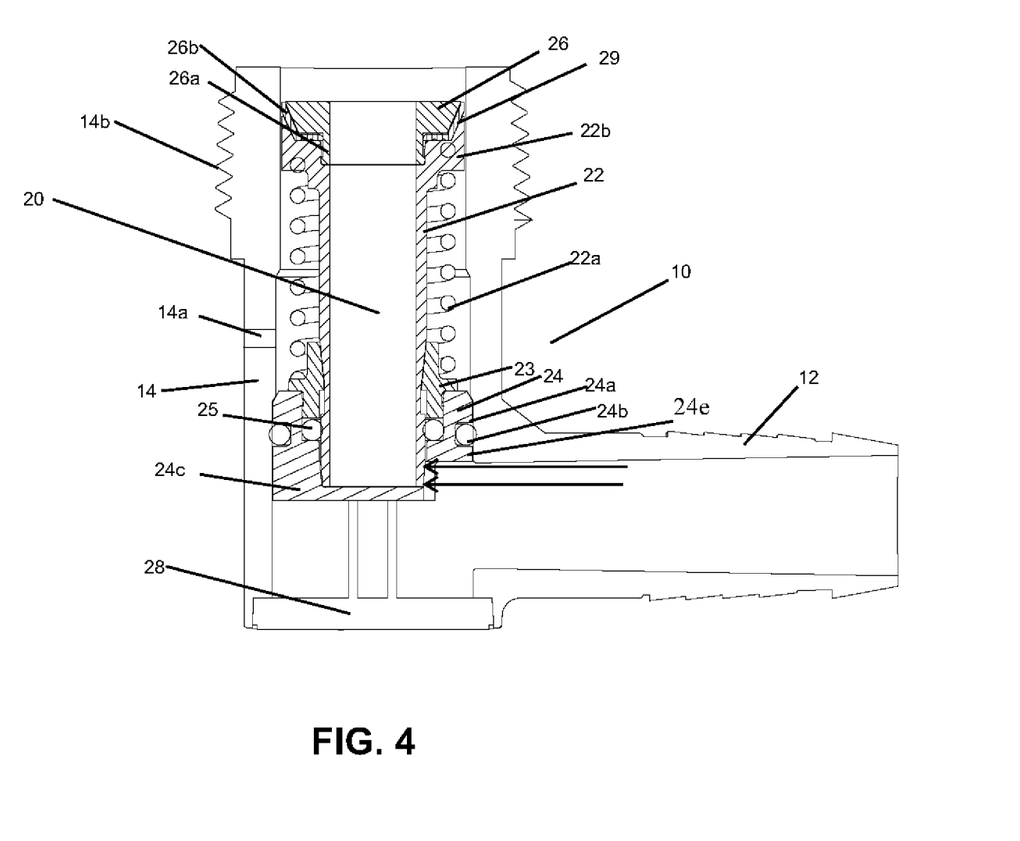
FIG. 4 illustrates the elbow connector with the pressure regulator assembly of FIG. 1 in a fully closed position in accordance with an embodiment of the present application.
Figure 5:
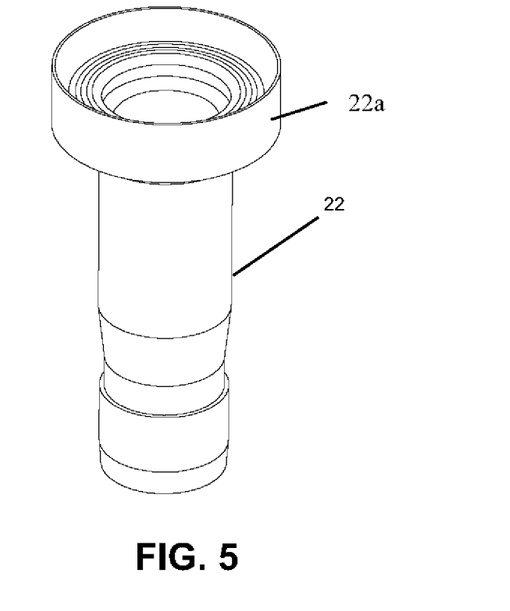
FIG. 5 illustrates a more detailed view of a movable pressure responsive member of the pressure regulator assembly in FIG. 1 in accordance with an embodiment of the present application.

In embodiments, when the pressure rises above a certain threshold, the pressure responsive member 22 may be pushed down into the closed position of FIG. 4. In embodiments, the force needed to overcome the bias force of the pressure biasing element 22a to force the pressure responsive member 22 into the closed position is about 30 to 50 psi. In embodiments, as noted above, the pressure biasing element 22a may be selected to provide a desired biasing force. In this position, the bottom edge of the pressure responsive member 22 covers the slots 24g in the inlet grate 24c and prevent water from entering the vertical segment 14, which prevents water from flowing into the sprinkler assembly 1.

If and when the external pressure decreases, the pressure exerted on the pressure responsive member 22 also decreases. In embodiments, the pressure responsive member 22 will then move back up, toward the open position under the influence of the pressure biasing element 22a. In embodiments, the biasing element 22a may be selected in order to provide a predetermined maximum biasing force, which corresponds to the threshold pressure required to move the pressure responsive member 22 into the closed position. Thus, adjustment of the biasing element 22a may be used to adjust operation of the pressure regulator assembly 20.

In embodiments, the pressure regulating assembly 20 may be integrated into the elbow connector 10 during construction thereof. In embodiments, the pressure regulating assembly 20 may be installed or inserted into elbow connector after it is manufactured but before it is assembled.

In embodiments, providing the pressure regulating assembly 20 in the elbow connector 10 allows pressure regulation of individual sprinkler assemblies, without crowding or complicating the internal components of the sprinkler assembly 1.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A pressure regulator assembly mounted in an elbow connector comprises:
   a stationary valve seat mounted in the elbow connector, the elbow connector including:
      a horizontal segment configured for connection to a water supply; and
      a vertical segment in fluid communication with the horizontal segment and extending upward therefrom; and
   a pressure responsive member mounted above the stationary valve seat and movable between an open position in which water flows through the stationary valve seat and a closed position in which the pressure responsive member blocks flow of water through the stationary valve seat;
   wherein the pressure responsive member is biased into the open position and movement of the pressure responsive member depends on prevailing pressure upstream of the pressure responsive member; and wherein the pressure regulator is integrated into the vertical segment and the stationary valve seat is positioned at an inlet of the vertical segment.

2. The pressure regulator assembly of claim 1, wherein the stationary valve seat further comprises a grate, wherein the grate comprises:
a ring-shaped base positioned at the inlet of the vertical segment;
one or more ribs extending downward from the ring-shaped base and connected to a disk element such that one or more slots are formed between the ribs and the disk element to allow water to flow into the stationary valve seat,
wherein the one or more slots are positioned such that the pressure responsive member blocks the one or more slots when it is in the closed position.

3. The pressure regulator assembly of claim 2, further comprising:
a retainer element mounted above the stationary valve seat;
an inner seal positioned between the retainer element and the pressure responsive member to prevent water from leaking between the retainer element and the pressure responsive member; and
an outer seal positioned between the stationary valve seat and an inner wall of the vertical segment to prevent water from leaking between the stationary valve seat and the vertical segment such that water passes through the one or more slots in order to flow upward through the vertical segment.

4. The pressure regulator assembly of claim 3, further comprising a biasing element positioned between the pressure responsive member and the retainer element and biasing the pressure responsive member in the open position.

5. The pressure regulator assembly of claim 4, wherein the vertical segment includes a pressure reference opening formed therein at a point substantially in the middle of the pressure responsive member to provide a reference pressure.

6. The pressure regulator assembly of claim 1, further comprising an upper retainer element provided in a top portion of the vertical segment and positioned to hold the pressure responsive element in the vertical segment.

7. The pressure regulator assembly of claim 6, further comprising an upper seal positioned between the upper retainer element and the pressure responsive member and configured to prevent water from leaking between the pressure responsive member and the upper retainer.

8. The pressure regulator assembly of claim 1, further comprising a cap spacer mounted below the stationary valve seat and in contact with the stationary valve seat to hold it in place at the inlet of the vertical segment.

9. An elbow connector configured for connection to a sprinkler assembly, the elbow connector comprising:
a horizontal segment in fluid communication with a source of water;
a vertical segment in fluid communication with the horizontal segment and extending upward therefrom; and
a pressure regulator assembly,
the pressure regulator assembly including:
a stationary valve seat provided at an inlet of the vertical segment; and
a pressure responsive member mounted above the stationary valve seat and integrated into the vertical segment and movable between an open position in which water flows through the stationary valve seat and a closed position in which the pressure responsive member blocks flow of water through the stationary valve seat;
wherein the pressure responsive member is biased in the open position and movement of the pressure responsive member depends on prevailing pressure upstream of the elbow connector.

10. The elbow connector of claim 9, wherein the pressure regulator assembly is mounted in the vertical segment such that the stationary valve seat is mounted at an inlet of the vertical segment.

11. The elbow connector of claim 10, wherein the stationary valve seat further comprises a grate through which water flows into the vertical segment,
wherein the grate includes:
a ring-shaped base positioned at the inlet of the vertical segment;
one or more ribs extending downward from the ring-shaped base and connected to a disk element such that one or more slots are formed between the ribs and the disk element to allow water to flow into the stationary valve seat,
the one or more slots are positioned such the pressure responsive member blocks the one or more slots when in the closed position.

12. The elbow connector of claim 11, further comprising:
a retainer element mounted above the stationary valve seat to prevent upward movement of the stationary valve seat;
an inner seal positioned between the retainer element and the pressure responsive member to prevent water from leaking between the retainer element and the pressure responsive member; and
an outer seal positioned between the stationary valve seat and an inner wall of the vertical segment to prevent water from leaking between the stationary valve seat and the vertical segment such that water passes through the one or more slots in order to flow upward through the vertical segment.

13. The elbow connector of claim 12, further comprising a biasing element positioned between the pressure responsive member and the retainer element and biasing the pressure responsive member in the open position.

14. The elbow connector of claim 13, wherein the vertical segment includes a pressure reference opening formed therein at a point substantially in the middle of the pressure responsive member to provide a reference pressure.

15. The elbow connector of claim 10, further comprising an upper retainer element provided in a top portion of the vertical segment and positioned to hold the pressure responsive element in the vertical segment.

16. The elbow connector of claim 15, further comprising an upper seal positioned between the upper retainer element and the pressure responsive member and configured to prevent water from leaking between the pressure responsive member and the upper retainer.

17. The elbow connector of claim 10, further comprising a cap spacer mounted below the stationary valve seat and in contact with the stationary valve seat to hold it in place at the inlet of the vertical segment.

18. The elbow connector of claim 10, further comprising a fastener provided on an outer surface of the vertical segment and operable to connect to the sprinkler assembly.

* * * * *